Sept. 24, 1935.  C. M. ELLENBERGER ET AL  2,015,422
SPARE WHEEL MOUNTING STRUCTURE
Filed May 9, 1933  3 Sheets-Sheet 1

Inventors
Clarence M. Ellenberger
John E. Blank
Bearl O. Prentice
by
Attorney

Sept. 24, 1935.  C. M. ELLENBERGER ET AL  2,015,422
SPARE WHEEL MOUNTING STRUCTURE
Filed May 9, 1933   3 Sheets-Sheet 2

Inventors
Clarence M. Ellenberger
John E. Blank
Bearl O. Prentice
by Townsend & Beaman
Attorney Sept. 24, 1935.  C. M. ELLENBERGER ET AL  2,015,422
SPARE WHEEL MOUNTING STRUCTURE
Filed May 9, 1933   3 Sheets-Sheet 3

Inventors
Clarence M. Ellenberger
John E. Blank
Bearl O. Prentice
by
Attorney

Patented Sept. 24, 1935

2,015,422

UNITED STATES PATENT OFFICE 2,015,422

SPARE WHEEL MOUNTING STRUCTURE

Clarence M. Ellenberger, John E. Blank, and Bearl O. Prentice, Jackson, Mich., assignors to Ryerson & Haynes, Inc., Jackson, Mich., a corporation of Michigan Application May 9, 1933, Serial No. 670,132

18 Claims. (Cl. 224—29)

The present invention relates to mechanisms for facilitating the mounting of the spare wheel from or upon the vehicle body.

An important object of the invention is to provide a mounting structure having means for readily affixing or guiding the spare wheel into a supported position with additional means preferably in the form of a single clamping member or the equivalent for rigidly retaining the wheel in a definite location obviating the use of the usual securing bolts or screws.

Other objects and advantages reside in the novel features of construction and arrangement and combination of parts as will be more fully related. The invention is clearly set forth in the appended claims.

In the accompanying drawings wherein several embodiments of our invention are disclosed for the purpose of illustration, Fig. 1 is a side elevation of the bracket supporting the clamping mechanism.

Figure 1:
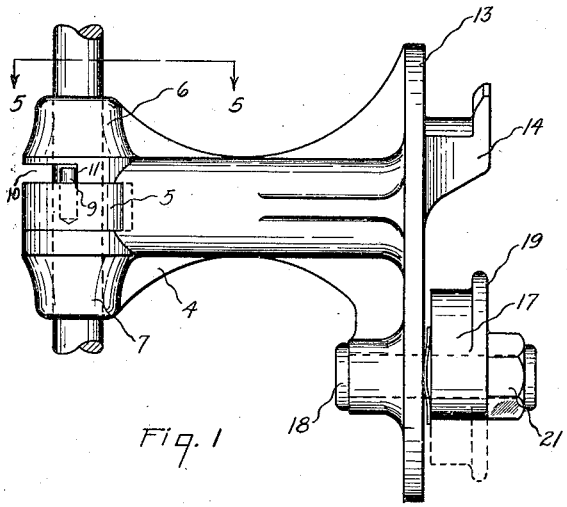
Figure 2:
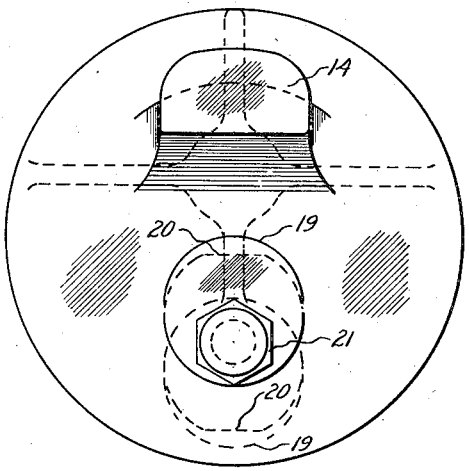
Fig. 2 is a front elevation of the bracket shown in Fig. 1.
Figure 3:
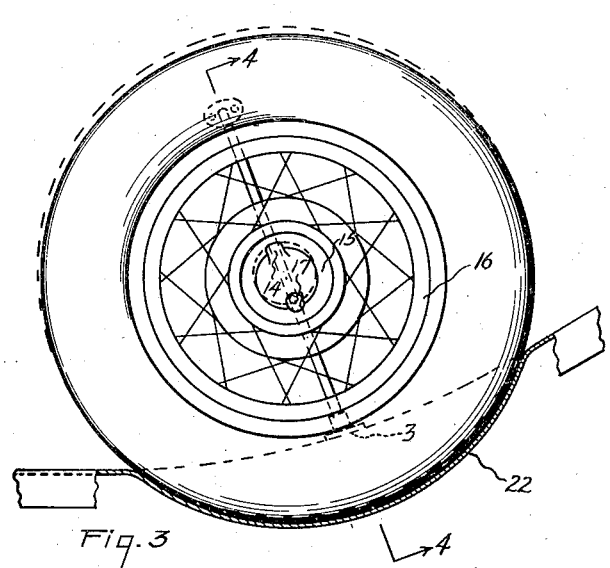
Fig. 3 is a front elevation of the invention employed to clamp the spare wheel into the fender well.

Generally, the present invention resides in a suitable mounting post secured to the vehicle body or frame carrying a positioning and clamping plate which may be integral with the post or suitably connected thereto. To facilitate the initial positioning of the spare wheel, a member, preferably hook-shaped in cross section, is supported outwardly from the face of the plate over which a portion of the hub may be readily inserted. When the wheel is to be solely supported by the plate, as on the wheel carrier at the rear of the car, the wheel will be entirely supported from the hook-shaped member. On the other hand, when the spare wheel is to be clamped into the fender well, the hook-shaped member merely guides the hub and positions the wheel in a vertical plane. For rigidly securing the wheel in position, a clamping mechanism is supported from the plate capable of being brought into selective engagement with the hub of the wheel. In its simplest form, the clamping mechanism may take the form of an eccentric member which may be rotated into clamping engagement with the hub by a wrench or other suitable means. When the invention is employed in combination with a fender well, the rotation of the eccentric member clamps the wheel against the bottom of the well; the hub of the wheel being guided by the hook-shaped member as the wheel is forced into the well. In the other embodiment, the rotation of the eccentric clamps the hub against the hook member.

Having specific reference to the illustrated embodiment of the invention, in Figs. 1 to 5, inclusive, mechanism is shown for clamping and supporting the spare wheel in the usual fender well comprising a post 1 of any suitable construction secured to the vehicle as at 2—3. A member 4 is supported from the post 1 and in its preferred form is pivoted on the post and has bearing upon an adjustable collar 5 confined between spaced post embracing portions 6—7. The collar 5 is held against rotation by a set screw 8 or the like and carries a stop pin 9. To limit the pivoting of the member 4 on the post 1, the portion 6 is undercut as at 10 to provide shoulders 11—12 against which the stop pin 9 abuts to limit the swing of the member 4 in opposite directions. To accommodate various sized wheels and tires, the member 4 may be adjusted longitudinally of the post 1 by loosening the set screw 8.

Figure 4:
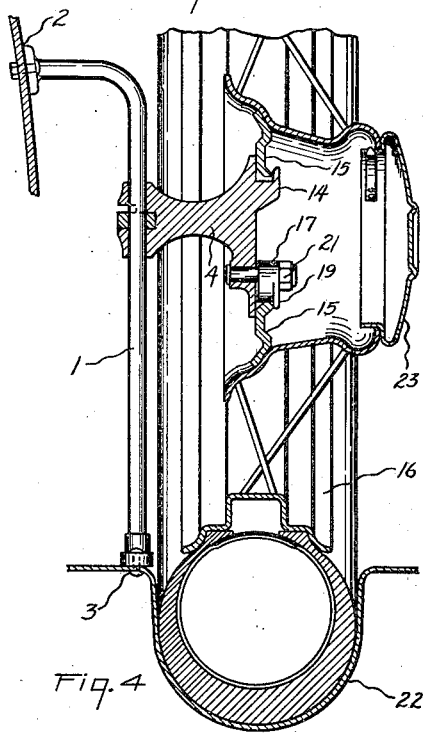
Fig. 4 is a cross sectional view taken on line 4—4 of Fig. 3.
Figure 5:
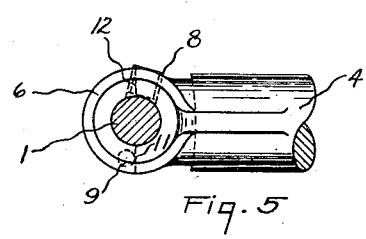
Fig. 5 is a cross sectional view taken on line 5—5 of Fig. 1 of the pivoted support of the bracket.

A surface 13 is provided against which the hub of the wheel may abut to retain the same in a definite plane. The surface may be integral with the member 4 as shown or otherwise suitably supported therefrom. A hook-shaped member 14 extends outwardly from the surface 13 to engage the usual inner hub flange 15 of the wheel 16. As shown in detail in Figs. 1 and 2, a clamping cam or eccentric 17 is rotatably supported upon a stub shaft 18 approximately directly below the member 14. The cam is preferably provided with a shoulder 19 along the outer edge of the high point to engage the outer edge of the flange 15 as shown in Fig. 4. As illustrated a nut 21 is integral with or otherwise affixed to the cam 17 through which the latter is rotated upon being engaged by the proper tool; numerous other ways of rotating the cam 17 may be employed within the spirit of the invention as will be readily apparent. Preferably, a flat portion 20 is provided upon the cam 17 at the high point.

The operation of the foregoing described follows: With the member 4 substantially pivoted upon the post 1 out of the position shown in Fig. 4 and the cam 17 in the full line position shown in Figs. 1 and 2, the wheel 16 is placed in the fender well 22 and steadied in approximately a vertical plane. The member 4 may now be pivoted outwardly into the hub of the wheel 16 into approximately the position shown in Fig. 4 and the flange 15 hooked over the member 4 by slightly lifting the wheel out of the well. At this point the wheel 16 is fairly well supported in position and no further steadying is required upon the part of the operator. The usual hub cap 23 if in position is removed and a socket wrench or the like is affixed to the nut 21 rotating the cam 17 into engagement with the lower portion of the flange 15. The rotation of the cam is effective to force the entire wheel from the dotted line position to the full line position of Fig. 3 into clamping relationship with the well 22. With the cam 17 in the dotted line position shown in Fig. 2, the flat portion 20 will be in engagement with the flange 15 to obviate any tendency for the cam to rotate from a clamping position upon vibration. As seen in Fig. 4 the upper portion of the flange is merely guided by the member 14 and is not drawn into abutting engagement with the bottom of the member upon rotation of the cam 17. Thus it is to be understood that means have been provided for securing a spare wheel in position in a fender well through the partial rotation of a single member without the employment of the usual bolts and screws. The removal of the spare wheel from the well is the reverse of the described securing operation.

It is to be further understood that it is not always necessary that the member 4 be pivoted or otherwise removed from the position shown in Fig. 4. When the fender well is sufficiently large to loosely receive the wheel laterally, the member 4 may be retained in a fixed position and the wheel inserted in the well and over the member 14. In case of this type, the post 1 and member 4 may be a unitary member.

Figure 9:
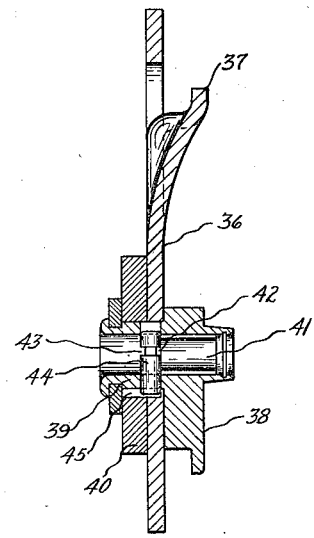
Fig. 9 is a cross sectional view of a modified type of supporting plate with the locking mechanism shown in combination with the clamping cam.

To avoid the unauthorized removal of the wheel from the well, the hub cap 23 may be of a lockable type preventing access to the nut 21. Another method is to equip the cam with a locking cylinder as shown in Fig. 9. The hook-shape of the member 14 and the shoulder 19 prevents the wheel from being removed from the surface 13 by loosening the set screw 8 and raising the associated members bodily from the fender well.

Figure 6:
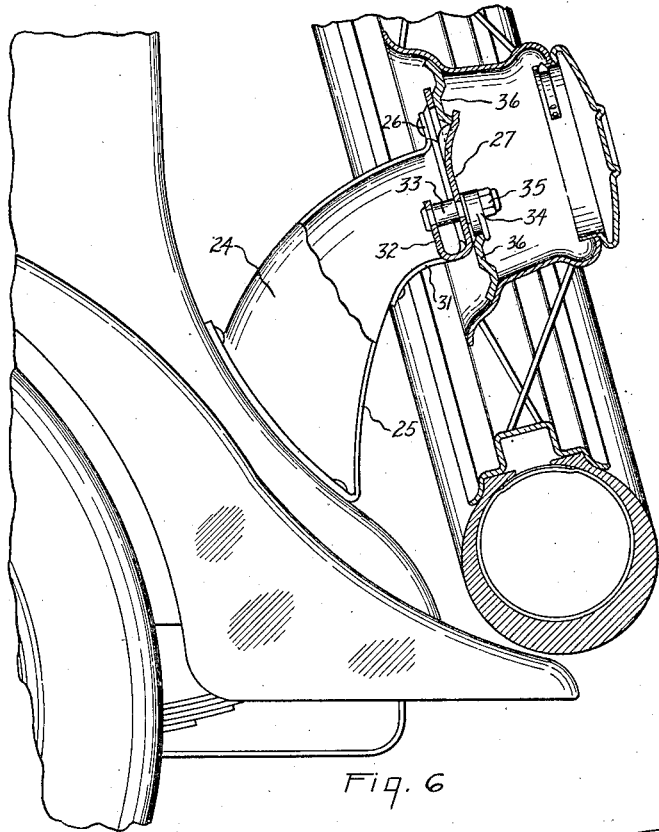
Fig. 6 is a cross sectional view of the principles of the invention applied to a rear spare wheel carrier.
Figure 7:
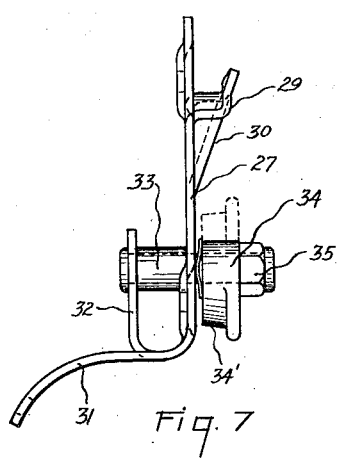
Figs. 7 and 8 are side and front elevational views respectively, of a sheet metal supporting plate embodying the principles of the invention which is adapted to be secured to the usual supporting arm for the spare tire and wheel.
Figure 8:
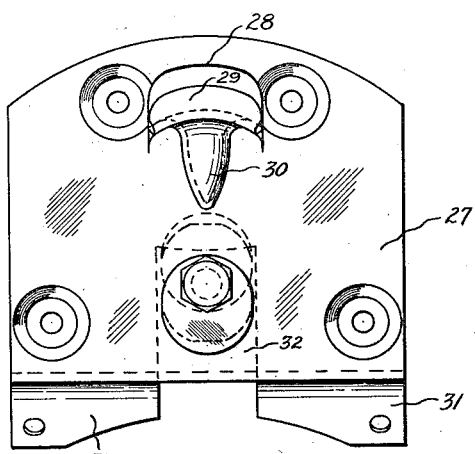

In Fig. 6, the principle of the invention is illustrated as applied to a mounting post at the rear of the car in which the cam is employed to clamp the spare wheel upon the supporting hook-shaped member in lieu of forcing the wheel into the fender well. As illustrated, a post 24 which may be tubular is provided with an under flange portion 25 and an outer flanged end 26. With this type of post structure, a sheet metal plate 27 is riveted or otherwise secured to the flange 26. This plate is preferably lanced at 28 and the severed metal formed to provide a supporting ledge 29 of hook-shaped cross section. To stiffen the ledge 29, a reinforcing rib 30 may be formed from the body of the plate beneath the ledge. As shown in Figs. 7 and 8, the plate 27 has lower flange portions 31 with a central lanced portion deflected to provide an upright portion 32 for adequately supporting the stub shaft 33 carrying the cam 34. The flange portions 31 are riveted to the flanges 25 to stiffen the entire assembly. A nut 35 is employed to rotate the cam 34 as had been heretofore described with reference to the Figs. 1 to 5. Preferably, the high point 34' of the cam 34 is sloped toward the plate 27.

In mounting the spare wheel upon the plate 27 carried by the post 24, the operator first inserts the inner hub flange 36 over the ledge 29 and the wheel is thus supported in abutting relationship with the plate 27. This operation is readily accomplished and the usual difficulty experienced in attempting to insert bolts carried by the post structure through holes in the inner hub flange of the wheel is obviated. The cam 34 is then rotated in a manner identical to the cam 17 to force the wheel downwardly and the flange 36 into clamping relationship with ledge 29; the slope of the cam 34 tending to urge the inner flange 36 into engagement with the plate 27.

As in the embodiment shown in Figs. 1 to 5, means have thus been provided for facilitating the initial mounting operation and for reducing the final securing operation to the rotation of a single element; in the broad aspect the present invention being considered as residing in a fixed guiding and initially supporting or steadying member capable of receiving a portion of the wheel, and manipulated means, preferably a single cam or the equivalent, for forcing the wheel in one direction into clamping relationship either with the fixed member or some other fixed surface such as the fender well.

In Fig. 9, a plate 36 is shown which is adapted to be affixed to a spare wheel mounting structure in any suitable manner. As shown the hook-shaped member 37 is lanced out of the plate 36 and may function as a guide similarly to the member 14 or as a support similarly to the member 29. The cam 38 is provided with a portion 39 journaled in a bearing in the plate 36 reinforced by an additional plate member 40 to lengthen out the bearing surface. A locking cylinder of any well known description is located within the cam 38 and carries an eccentric pin 42 coacting with an annular groove 43 in the bolt 44. A slot 45 is provided in the plates 36—40 into which the bolt 44 is moved to lock the cam 38 against unauthorized rotation when in a wheel clamping position. To unlock the cam the key is inserted in the end of the cylinder 4 and the bolt 44 withdrawn upon rotation of the cylinder. The key may then be removed and the cam rotated out of a wheel clamping position in any suitable manner.

Figure 10:
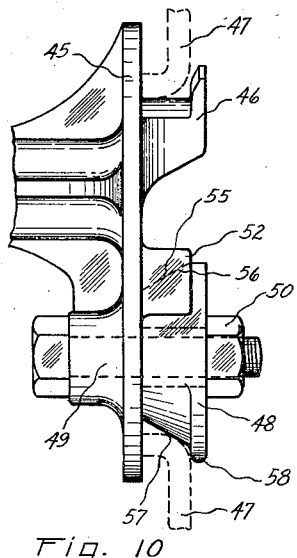
Figs. 10 and 11 are side and front elevational views, respectively, of a modified type of clamping member.
Figure 11:
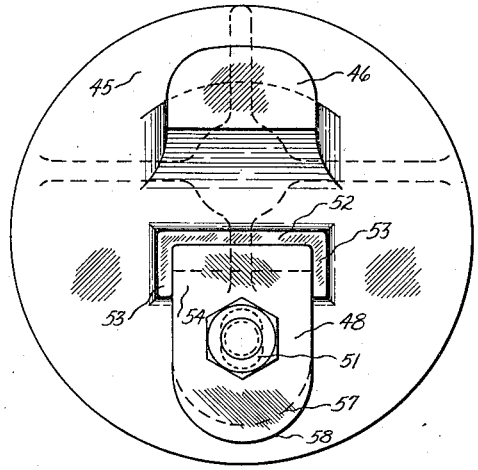
Figure 12:
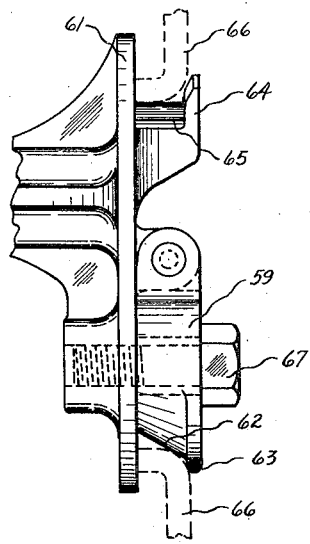
Figs. 12 and 13 are views similar to Figs. 10 and 11 of a still further modified type of clamping member.

In Figs. 10 to 12, two possible modifications for accomplishing the clamping action of the rotatable cam are illustrated. Having reference to Figs. 10 and 11, the surface 45 supports a hook-shaped member 46 which may receive the inner hub 47 of the wheel to either support the wheel or guide the same to a clamped seat. A clamping member 48 is removable from the bolt 49, which may be welded in position, upon removal of the nut 50. The clamping member is provided with an elongated opening 51 through which the bolt 49 passes. A camming and aligning member 52 is preferably cast integral with the surface 45 being recessed to provide shoulder portions 53 between which the upper end 54 of the clamping member 48 is confined and restrained against rotation. This recess has a sloping upper inner wall 55 with which a complementary surface 56 of the clamping member 48 engages and slides upon tightening of the nut 50. The lower end of the member 48 is also sloped as at 57 and is provided with a shoulder 58.

With the clamping member 48 removed or loosened and turned to one side, the hub flange of the wheel is received in the member 46. Then with the member 48 aligned to be drawn between the shoulder 53, the nut 50 is tightened and the camming action between the surfaces 55—56 and the sloping surface 57 forces the flange 47 of the wheel downwardly to clamp the flange against the member 46 or some other portion of the wheel against a fixed surface in a manner heretofore described. In some cases the cam action of either the slope 57 or the complementary slopes 55—56, upon drawing the clamping member 48 into place by tightening the nut 50 will be sufficient to effect the clamping action. When the action of the slopes 55—56 is omitted, obviously, the slot 51 may conform to the shank of the bolt 49 as the member 48 will not then move laterally of the bolt upon tightening the nut 50.

Figure 13:
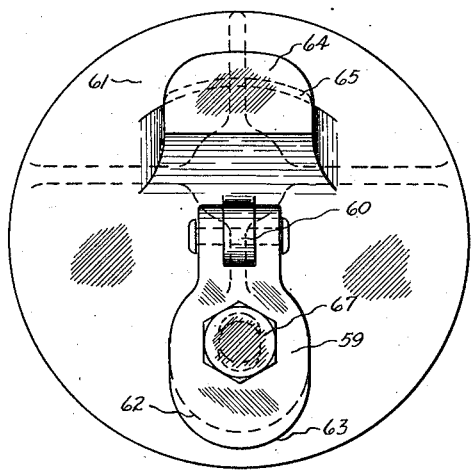

In the modification shown in Figs. 12 and 13, the clamping member 59 is pivoted upon a projection 60 integral with the surface 61. As shown, the lower portion 62 of the clamping member is sloped and is provided with a shoulder portion 63. The hook-shaped member 64 is illustrated as having a resilient lined portion 65 which may take the form of a rubber or spring member or the like. This prevents the inner flange 66 of the hub from being drawn down into abutting engagement with a practically unyielding ledge when the member 59 is drawn into the position shown in Fig. 12 upon tightening down the removable cap screw 67. The members 14—29—46 shown in Figs. 1 to 11, inclusive, may likewise be equipped with a resilient seat for like reasons.

When the hub of the wheel is to be inserted over the member 64 or removed therefrom, the clamping member 59 is swung upwardly from the position shown in Fig. 12. If desired suitable means (not shown) may be provided for retaining the member 59 in any position to which it is swung.

We have shown several practical and efficient embodiments of the various features of the invention, but we do not desire to be limited to the exact construction and arrangement of parts as shown, and modifications and changes may be made without departing from the scope of the invention as defined by the appended claims.

Having described our invention, what we claim and desire to protect by Letters Patent is:

1. In a spare wheel mounting structure, the combination with a surface against which the hub of the wheel abuts, a fixed member extending outwardly from said surface to receive only the upper portion of the hub and having means thereon to restrain the same against movement normal to said surface, and an oscillatable camming mechanism likewise extending outwardly from said surface engaging only the lower portion of said hub to restrain movement of said hub in any plane.

2. In a spare wheel mounting structure, the combination with a surface against which the hub of the wheel abuts, a member for receiving only the upper portion of the hub and having means thereon to restrain the same against movement normal to said surface, and an eccentric camming member engaging only the lower portion of the hub upon manipulation to force said hub downwardly into clamping position.

3. In a spare wheel mounting structure, the combination with a surface against which the hub of the wheel abuts, a member rigidly fixed to said surface for receiving only the upper portion of the hub and having means thereon to restrain the same against movement normal to said surface, and an eccentric camming member engaging only the lower portion of the hub upon manipulation to restrain the same against movement normal to said surface and to force said hub downwardly into clamping position.

4. In a spare wheel mounting structure, the combination with a surface against which the hub of the wheel abuts, fixed means receiving the upper part of the hub to locate the same, and means including an eccentric camming member engaging the lower portion of said hub to restrain the wheel against movement relative to said surface.

5. In a spare wheel mounting structure, the combination with a surface against which the hub of the wheel abuts, fixed means receiving the upper part of the hub to limit its downward movement and to guide it in a plane substantially parallel to said surface, and regulable means movable relative to said first means engaging the lower portion of said hub upon manipulation to restrain the wheel against movement relative to said surface.

6. In a spare wheel mounting structure, the combination with fixed means for receiving a part of the hub of the wheel to locate the same upon initial mounting manipulation, of a single oscillatable camming means movable relative to and independently of said first means engaging a part of the hub spaced from said first part to force said hub downwardly into a clamped position.

7. An article of manufacture adapted to be secured to the spare wheel supporting structure of a vehicle, comprising a plate member attachable to the supporting structure against which the hub of the wheel abuts, said member carrying a ledge of hook-shaped cross section extending outwardly for receiving the upper portion of the hub, a cam rotatably supported from said plate for engaging the lower edge of the hub opening to cam the wheel downwardly into supported position, and means for rotating said cam.

8. An article of manufacture adapted to be secured to the spare wheel supporting structure of a vehicle, comprising a plate member attachable to the supporting structure against which the hub of the wheel abuts, said member carrying a ledge of hook-shaped cross section extending outwardly for receiving the upper portion of the hub, a cam rotatably supported from said plate for engaging the lower edge of the hub opening to cam the wheel downwardly into supported position, and means to prevent rotation of said cam from a clamped position.

9. An article of manufacture adapted to be secured to the spare wheel supporting structure of a vehicle, comprising a plate member attachable to the supporting structure against which the hub of the wheel abuts, said member carrying a ledge of hook-shaped cross section extending outwardly for receiving the upper portion of the hub to support the wheel, a cam rotatably supported from said plate for engaging the lower portion of the hub to clamp the hub in said ledge and against said plate, said cam being provided with a shoulder to prevent withdrawal of the hub with the cam in a clamping position, and means for preventing the unauthorized rotation of said cam from a clamping position.

10. In a spare wheel mounting structure the combination of means including a surface against which the hub of a wheel is adapted to abut, a hook rigidly secured thereto for guiding the upper portion of the hub to restrain the same against movement normal to said surface, and having means to limit downward movement of said wheel, and means to cam the lower edge of the hub opening, upon manipulation thereof, to force said hub against said limiting means into clamping position.

11. In a spare wheel mounting structure the combination of means including a surface, a hook shaped ledge carried by said means for receiving the upper portion of the hub of the wheel to restrain the same against movement normal to said surface and to limit downward movement of said hub, and camming means supported by said surface for engaging the lower edge of the hub opening to force the same downwardly into clamping position.

12. In a spare wheel mounting structure the combination of a plate including the surface against which the hub of the wheel is adapted to be clamped, a hook opening upwardly, integrally formed with and struck from said plate, for receiving the upper portion of the wheel hub and to restrain the same against movement normal to said surface and camming means secured to said plate and engageable with the lower edge of the hub opening to force the same into clamping position.

13. In a spare wheel mounting structure the combination of means including a surface against which the hub of a wheel is adapted to abut, a hook rigidly secured thereto for receiving the upper portion of the hub and to restrain the same against movement normal to said surface and camming means pivotably secured to said surface for rotation in a plane substantially parallel to said surface to engage the lower portion of said hub, to force the safe downwardly into clamping position.

14. In a spare wheel mounting structure the combination with a surface against which the hub of the wheel abuts, means to guide said hub for movement in a plane substantialy parallel to said surface, means to limit downward movement of said wheel and means extending outwardly from said surface engaging with the lower edge of said hub opening to cam the wheel downwardly against said limiting means and to maintain said hub against movement normal to said surface.

15. In a spare wheel mounting structure the combination with a surface against which the hub of the wheel abuts, means extending outwardly from said surface to guide the hub in a direction parallel to said surface and to restrain the same against movement normal to said surface, and means also extending outwardly from said surface engaging the lower edge of said hub opening to force the same downwardly against said receiving means whereby said wheel is clamped against movement in any plane.

16. In a spare wheel mounting structure, the combination with a surface against which the hub of the wheel abuts, means to guide said hub for movement in a plane substantially parallel to said surface, means to limit the downward movement of said wheel and an eccentric cam mounted on and extending outwardly from said surface engaging with said hub to force the wheel downwardly against said limiting means and inwardly against said surface to clamp said wheel against movement in any plane.

17. In a spare wheel mounting structure, the combination with a surface against which the hub of the wheel abuts, means extending outwardly from said surface to limit the downward movement of said wheel and to guide the hub in a direction parallel to said surface, said means comprising a hook-shaped bracket, and oscillatable camming means mounted on the extending outwardly from said surface engaging the lower portion of said hub to force the same downwardly against said limiting means and inwardly against said surface whereby said wheel is clamped against movement in any plane.

18. In a spare wheel mounting structure, the combination with a surface against which the hub of the wheel abuts, a member for receiving only the upper portion of the hub and having means thereon to restrain the same against movement normal to said surface, and an eccentric cam extending outwardly from said surface engaging with said hub to cam the wheel downwardly against said receiving member and to maintain said hub against movement normal to said surface.

CLARENCE M. ELLENBERGER.
JOHN E. BLANK.
BEARL O. PRENTICE.